United States Patent
Schobess et al.

(10) Patent No.: US 10,807,477 B2
(45) Date of Patent: Oct. 20, 2020

(54) CHARGING DEVICE AND METHOD FOR CHARGING AN ELECTRICAL ENERGY STORAGE DEVICE OF A VEHICLE, AS WELL AS MOTOR VEHICLE

(71) Applicant: AUDI AG, Ingolstadt (DE)

(72) Inventors: Nico Schobess, Gaimersheim (DE); Matthias Hartmann, Koesching (DE); Mohamed Hammam, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 395 days.

(21) Appl. No.: 15/920,770

(22) Filed: Mar. 14, 2018

(65) Prior Publication Data

US 2018/0297479 A1 Oct. 18, 2018

(30) Foreign Application Priority Data

Apr. 18, 2017 (DE) .................. 10 2017 206 497

(51) Int. Cl.
*B60L 11/18* (2006.01)
*B60L 53/24* (2019.01)
*B60L 53/10* (2019.01)

(52) U.S. Cl.
CPC .......... *B60L 11/1814* (2013.01); *B60L 53/24* (2019.02); *B60L 53/11* (2019.02); *B60L 2210/10* (2013.01); *B60L 2220/54* (2013.01); *Y02T 10/70* (2013.01)

(58) Field of Classification Search
CPC ...... B60L 11/1814; B60L 53/24; B60L 53/11; B60L 2220/54; H02J 7/00
See application file for complete search history.

(56) References Cited

U.S. PATENT DOCUMENTS

| | | | |
|---|---|---|---|
| 5,500,579 A * | 3/1996 | Kim | B60L 53/11 318/493 |
| 9,748,887 B2 * | 8/2017 | Notohara | H02P 25/22 |
| 9,914,362 B2 * | 3/2018 | Ngo | B60L 11/1803 |

FOREIGN PATENT DOCUMENTS

| | | |
|---|---|---|
| DE | 3204901 A1 | 11/1982 |
| DE | 69617026 T2 | 6/2002 |
| DE | 102015208747 A1 | 11/2016 |
| DE | 102016209905 A1 | 12/2016 |
| JP | 2012-191813 A | 10/2012 |

* cited by examiner

*Primary Examiner* — Richard V Muralidar
(74) *Attorney, Agent, or Firm* — Maier & Maier, PLLC

(57) ABSTRACT

A charging device and a method for charging an electrical energy storage device of a vehicle, with a DC converter for converting an input DC voltage into an output DC voltage. A winding of an electrical machine is part of the DC converter. The winding has at least two coils. A control unit is designed for the purpose of switching the at least two coils electrically in series for the charging of the electrical energy storage device. The at least two coils form an inductance of the DC converter.

5 Claims, 2 Drawing Sheets

CHARGING DEVICE AND METHOD FOR CHARGING AN ELECTRICAL ENERGY STORAGE DEVICE OF A VEHICLE, AS WELL AS MOTOR VEHICLE

FIELD

The invention relates to a charging device for charging an electrical energy storage device of a vehicle, as well as a motor vehicle with such a charging device. Furthermore, the invention relates to a method for charging an electrical energy storage device of a vehicle.

BACKGROUND

Such a charging device and such a method are already known, for example, from DE 10 2015 208 747 A1. The charging device comprises a DC converter for converting an input DC voltage into an output DC voltage for the charging of an electrical energy storage device of the vehicle. Here, a winding of an electrical machine is part of the DC converter. For example, the vehicle can be driven by means of the electrical machine. The winding here comprises at least two coils. Furthermore, a control unit is provided for actuating the DC converter.

In the context of the method, the energy storage device is charged with electrical energy or electric current by means of the DC converter. For this purpose, the input DC voltage is converted into the output DC voltage by means of the DC converter. Thus, the energy storage device is designed for the purpose of storing electric energy, with which the electrical machine can be supplied, for example.

DE 3204901 A1 discloses a device with a chopper for battery charging, wherein during a charging the chopper is connected in series with a primary coil of a transformer. In a motor control mode, the chopper controls a current going to a series motor.

SUMMARY

Furthermore, JP 2012 191813 discloses a switched reluctance motor, in which a motor control unit can switch multiple coil groups in series or in parallel, in order to minimize discontinuous torque fluctuations.

The object of the present invention is to provide a charging device and a method for charging an electrical energy storage device of a vehicle, making possible an especially advantageous charging of the electrical energy storage device.

This object is achieved by a charging device and a method with the features of the independent claims. Advantageous embodiments of the invention are indicated in the dependent claims.

A first aspect of the invention relates to a charging device for a vehicle, especially for a motor vehicle such as a passenger car. The charging device comprises a DC converter for converting an input DC voltage into an output DC voltage for charging an electrical energy storage device of the vehicle. In this case, a winding of an electrical machine, especially of the vehicle, is part of the DC converter, wherein the winding comprises at least two coils. Moreover, the charging device comprises a control unit for actuating the DC converter.

Now, in order to be able to charge the energy storage device especially advantageously, in particular especially efficiently and economically, it is proposed according to the invention that the control unit is designed to switch the at least two coils electrically in series for the charging of the electrical energy storage device, wherein the at least two coils form an inductance of the DC converter.

The vehicle is designed, for example, as an at least electrically driven vehicle, especially as a motor vehicle, wherein at least one wheel of the vehicle, for example, or the entire vehicle is electrically drivable by means of the electrical machine. For this purpose, the electrical machine, which is preferably part of the vehicle, can be operated in a motor mode and thus as an electric motor. In order to operate the electrical machine as an electric motor, the electrical machine is supplied with electric energy from the energy storage device, which is preferably part of the vehicle. In this case, the electrical machine comprises the aforementioned at least one winding, which is a coil winding, for example. By winding can be meant in particular an assemblage of all coil-forming turns of at least one electrical conductor, such as an insulated wire, of the electrical machine.

By supplying the electrical machine with electric energy stored in the energy storage device, the energy storage device is discharged. In order to charge the energy storage device, electric energy is supplied to it across the DC converter, which comes from or is provided by a current source, for example, especially a charging station or the like. Usually, the electric energy provided by the current source has a first electric voltage. By means of the DC converter, it is possible to transform the first voltage into a different second electric voltage and thereby adapt it to a voltage advantageous for the charging of the energy storage device.

But now since, according to the invention, the coils which are parts or components of the electrical machine are also used as parts or components of the DC converter; the number of parts, the weight and the costs of the charging device or the vehicle as a whole can be kept especially low on the whole. Moreover, because the coils are connected in series, the use of a traditionally required supplemental inductance can be avoided, so that the number of parts, the weight and the costs can be kept especially low. Moreover, the energy storage device can be charged especially efficiently in this way. The switching of the coils in series or the series connected coils are also called a series connection. Thanks to the switching of the coils in series, the respective single inductances of the at least two coils add up to a total inductance of the series connection.

Traditionally, no such series connection is produced, but instead the coils are connected and thus switched in parallel by way of a star point on one side of the electrical machine, designed for example as an electric motor. This has the consequence that the respective single inductances of the coils add up reciprocally. In this way, the total inductance in the case of the prior art is even reduced as compared to the respective single inductances, so that, for example, an additional coil or inductance in addition to the already present coils of the electrical machine has to be hooked up in series, for example, behind the star point, in order to obtain a larger inductance as compared to the total inductance of the electrical machine. Such an additional coil is a component which may cause and result in additional weight, while such an additional component can be avoided in the charging device according to the invention.

Thanks to the series connection of the coils according to the invention to produce a large total inductance of the DC converter, the latter can also be operated especially advantageously or the connecting of the at least two coils in series according to the invention can achieve an especially advantageous charging of the electrical power storage. No additional inductance is required in addition to the electrical machine for the charging. Furthermore, it is not necessary to lead out the star point of the electrical machine from the latter.

In one advantageous embodiment of the invention, the DC converter comprises an inverter, especially a pulse inverter, wherein a first lead of the inverter is connected to the at least two electrically series-connected coils, and a second lead of the inverter is connected to the electrical energy storage device. Thanks to such an interconnecting of the inverter to the series-connected coils at one end and to the energy storage device at the other end, an especially advantageous integration of the inverter in the charging device is possible.

The energy storage device, which is designed, for example, as a battery, provides, for example, as output current or output voltage a direct current or a DC voltage. The electrical machine, especially in its motor operation, is operated however by means of alternating current or alternating voltage, for example. In order to accomplish this, the inverter is hooked up between the energy storage device and the electrical machine, so that the DC voltage provided by the energy storage device or the direct current provided by the energy storage device can be converted by means of the inverter into alternating voltage or alternating current, with which the electrical machine can be supplied, especially in its motor operation. During the charging of the energy storage device, the latter is charged, for example, by way of the inverter or by way of a component forming the inverter, yet during the charging no operation of the component as an inverter occurs, or during the charging no voltage or current conversion conducted by the inverter occurs.

For example, the alternating current by means of which the electrical machine is operated, especially in its motor operation, is a three-phase alternating current. The electrical machine driven in this way typically has three coils or the number of coils of the electrical machine is an integer multiple of three. For example, the inverter can be realized by a bridge circuit.

In one advantageous embodiment of the invention, the inverter comprises at least one switching element. Here, the control unit is designed for the purpose of actuating the at least one switching element to charge the electrical energy storage device. In this way, the inverter, which during travel of the vehicle generates an alternating voltage for the operating of the electrical machine from the DC voltage which is provided by the electrical energy storage device of the vehicle, can be switched in such a way that it can be used as a component of the DC converter during the charging.

In another advantageous embodiment of the invention, the DC converter comprises an interconnecting unit for switching the at least two coils in series. In addition, the control unit is designed to actuate the interconnecting unit to charge the electrical energy storage device. By means of the interconnecting unit, the at least two coils can be switched in series especially easily and as needed, so that the charging of the electrical energy storage device is especially advantageously possible. If the interconnecting unit is used together with the electrical machine for the charging of the electrical energy storage device, the number of parts needed for the charging of the energy storage device can be kept especially small. In this way, the costs, the weight and the space requirement of the charging device can be kept in especially low bounds.

In an especially advantageous embodiment of the invention, the control unit is designed for the purpose of switching the at least two coils in parallel with each other, especially by means of the interconnecting unit, in order to supply the electrical machine with electrical energy from the energy storage device. Alternatively or additionally, the control unit is designed to establish a star connection comprising the at least two coils, especially by means of the interconnecting unit, in order to supply the electrical machine with electrical energy from the energy storage device. Alternatively or additionally, the control unit is designed for the purpose of establishing a delta connection comprising the at least two coils, especially by means of the interconnecting unit, in order to supply the electrical machine with electrical energy from the energy storage device. In order to realize the star or the delta connection, the DC converter comprises at least one third coil of the winding, so that, for example, the at least three coils form the star or delta connection. The switching of the coils in parallel with each other is also called a parallel circuit. Thus, for example, it is possible for a propulsion of the vehicle and thus for the operation of the electrical machine in the motor operation to establish the parallel, star, or delta connection of the coils, so that an especially advantageous operation is possible. In this way, the interconnecting unit provides an especially large degree of freedom for the circuit topology, both in hardware and in functional extent.

In an especially advantageous embodiment of the invention, the charging device comprises a rectifier, which is connected at its output to the DC converter. By way of the rectifier, for example, the DC converter can be supplied with the electrical energy provided by the current source, especially by the charging station. Thanks to the rectifier, an especially advantageous charging of the energy storage device can be realized in the case when the current source provides an alternating voltage or an alternating current, since, for example, the alternating voltage provided by the current source or the alternating current provided by the current source can be transformed into a DC voltage or an alternating current by means of the rectifier. Thus, the rectifier can then provide the DC voltage, which can then be transformed, for example, by means of the DC converter, to an advantageous value.

For example, a charging current which is provided from the current source or which is drawn from a power grid must generally be transformed and/or rectified before it can be provided as charging current to the electrical energy storage device for the charging or recharging process. This can be done in especially advantageous manner by the inverter, for example.

In one advantageous embodiment of the invention, the control unit is designed for the purpose of actuating the rectifier for the charging of the electrical energy storage device. This eliminates, for example, an additional control unit, which would bring about additional costs and/or weight. Thus, an especially advantageous charging of the energy storage device can be realized. Likewise, the inverter could be controlled by the control unit and/or interconnecting unit so that it works or functions as a rectifier.

For example, thanks to the electronics of the charging device according to the invention, operating states such as the charging and the driving or the supplying of the electrical machine with electrical energy stored in the energy storage device can be switched especially quickly and/or especially easily. A switching of the operating states of the charging device is advantageously provided only when the vehicle is at standstill. In other words, there is no switching of the operating states during driving, for example. During the charging, the energy storage device is supplied with electrical energy across the DC converter and the at least two coils. During the motor operation, the electrical machine is supplied with electrical energy from the energy storage device by way of the DC converter and the at least two coils. During motor operation, the electrical machine is supplied with electrical energy from the energy storage device by way of the DC converter and at least two coils. In this way, the number of parts, the weight, the costs and the required space of the charging device can be kept especially low.

Furthermore, a simple changing of its circuit topology is possible for the charging device. For example, for the charging, the at least two coils of the electrical machine are switched in series by way of the interconnecting unit. In this way, the electrical machine as inductance is interconnected with switches of the inverter to form a DC converter, which may have an especially high inductance and thereby make possible an especially efficient charging of the electrical energy storage device. Other feasible circuit topologies are, for example, the star connection and/or the delta connection.

A second aspect of the invention relates to a motor vehicle with a charging device according to the invention. Advantages and advantageous embodiments of the first aspect of the invention are also to be considered as being advantages and advantageous embodiments of the second aspect of the invention, and vice versa.

A third aspect of the invention relates to a method for charging an electrical energy storage device of a vehicle, especially by means of a charging device according to the first aspect of the invention. In the method, an input DC voltage is converted into an output DC voltage by means of a DC converter for charging the electrical energy storage device, wherein a winding of the electrical machine comprising at least two coils of an electrical machine of the vehicle is used as part of the DC converter. Moreover, the DC converter is actuated by means of a control unit.

Now, in order to charge the energy storage device especially advantageously, in particular especially efficiently and economically, it is provided according to the invention that the at least two coils are switched electrically in series by means of the control unit through the actuating of the DC converter for the charging of the electrical energy storage device, wherein the at least two coils form an inductance of the DC converter. Advantages and advantageous embodiments of the first aspect and the second aspect of the invention are also to be considered as being advantages and advantageous embodiments of the third aspect of the invention, and vice versa.

BRIEF DESCRIPTION OF THE DRAWINGS

In the following, exemplary embodiments of the invention shall be described. For this, there are shown.

The exemplary embodiments explained below are preferred embodiments of the invention. In the exemplary embodiments, the components of the embodiments described each time constitute individual features of the invention, to be viewed independently of each other, which also enhance the invention independently of each other, and thus are also to be viewed as part of the invention, either individually or in another combination than the one shown.

Furthermore, the described embodiments may also be supplemented with other, already described features of the invention.

In the figures, elements of identical function are provided each time with the same reference numbers.

DETAILED DESCRIPTION OF THE DRAWINGS

Figure 1:
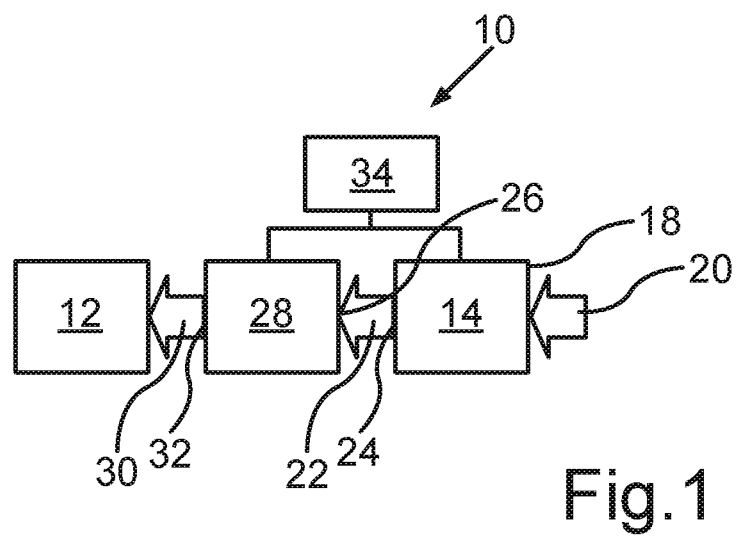
FIG. 1 a schematic circuitry of a charging device according to a first embodiment.
Figure 2:
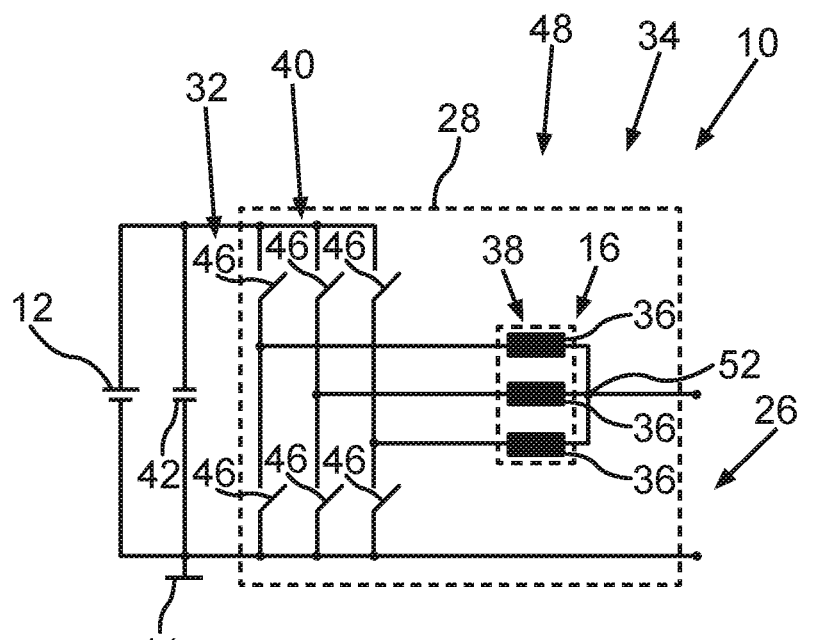
FIG. 2 a schematic circuit diagram of the charging device in a first operating state according to a second embodiment.

FIG. 1 shows schematically a circuitry of a first embodiment of a charging device 10 for a vehicle, especially an electrically driven motor vehicle. The charging device 10 serves for charging an electrical energy storage device 12, especially a battery, such as a traction battery of the vehicle, for example. By charging of the electrical energy storage device 12 is meant a storing of electric energy in the energy storage device 12. For this purpose, an electric current is taken or drawn from a power grid, for example, such as the public power grid of a country, and provided as charging current by means of the charging device 10 to the energy storage device 12. The electrical energy storage device 12 supplies energy, for example, to an electrical machine 16, especially an electric motor, of the vehicle. As can be seen from FIG. 2, the electrical machine 16 has at least one winding 38, comprising a plurality of coils 36. In FIG. 2 it can be seen that the winding 38 has at least three coils 36.

The electrical machine 16, which is preferably part of the vehicle, can drive in a motor mode at least indirectly, for example, at least one wheel of the vehicle or can drive the vehicle as a whole. In this way, an electric travel or an electric driving of the vehicle is possible, for example. During the driving, the electrical energy storage device 12 delivers the electrical energy stored in it to the electrical machine 16 operating as an electric motor and thereby becomes empty. In order to refill the electrical energy storage device 12 with electrical energy, or recharge it, it is supplied with electrical energy by means of the charging current during the charging process.

Generally, the current of the power grid is not available as charging current, for example, the current of the power grid is an alternating current. In order to be able to charge or recharge the electrical energy storage device 12 designed as a battery, for example, a direct current or a DC voltage is required, that is, the current of the power grid should be transformed and/or converted into charging current formed as direct current. Such a converting of an alternating current or an alternating voltage into a direct current or a DC voltage, especially into the charging current, takes place by means of a rectifier 14. The rectifier 14 may be a component of the vehicle or a component of a charging post of an electric charging station, for example, which is hooked up to the power grid. In particular, the rectifier 14 may be a component of the charging device 10. The rectifier 14 is supplied at its input side 18 with an alternating voltage 20, which is transformed or converted in the rectifier 14 into a DC voltage. This DC voltage is provided by the rectifier 14 at its output side 24.

The DC voltage is taken as an input DC voltage 22, by way of an input 26, into a DC converter 28. The DC converter 28 can transform or convert the input DC voltage 22 into an output DC voltage 30. Through the output DC voltage 30, which can be picked off at an output 32 of the DC converter 28, the charging current can flow to the electrical energy storage device 12 and charge or recharge it, so that the electrical energy storage device 12 is filled with electrical energy. In order to enable a defined current flow of the charging current to the energy storage device 12, a control unit 34 in this first embodiment of the charging device 10 controls the rectifier 14 and the DC converter 28.

In order to save time and/or costs, the charging of the electrical energy storage device 12 should be performed in an especially efficient manner by means of the charging device 10. For this purpose, the aforementioned winding 38 of the electrical machine 16 is part of the DC converter 28. This means that the coils 36 are components of the DC converter 28.

Now, in order to make possible an especially advantageous charging of the electrical energy storage device 12, the control unit 34 is designed for the purpose of switching the coils 36 for the charging of the electrical energy storage device 12 electrically in series, wherein the at least two coils 36 form an inductance of the DC converter 28. Thus, the DC converter 28, which can also be called a DC/DC converter, utilizes the coils 36 as an inductance for the charging of the energy storage device 12, or uses a total inductance formed by the coils 36, in order to transform the input DC voltage 22 into the output DC voltage 30.

Figure 3:
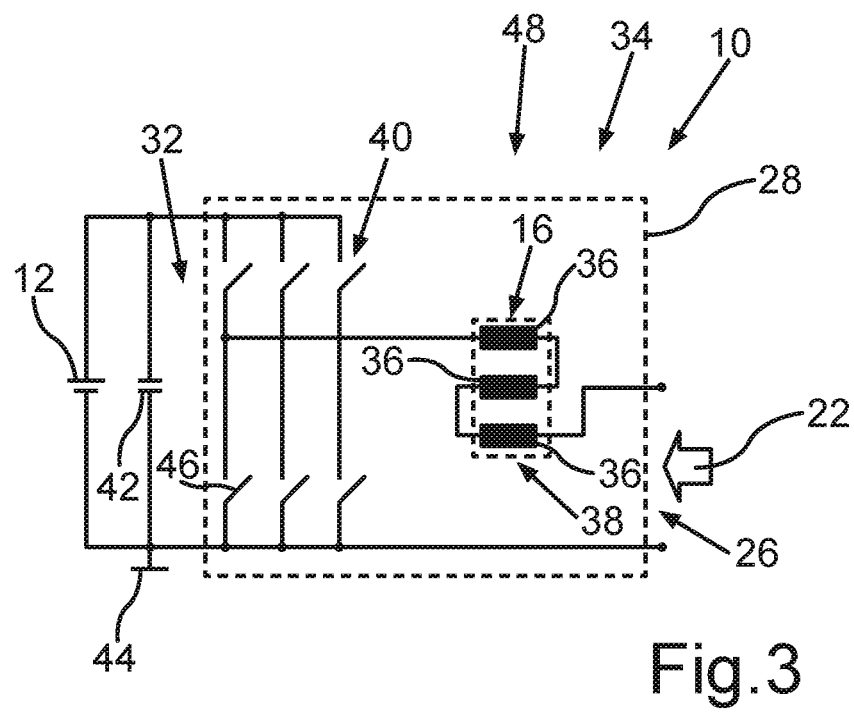
FIG. 3 a schematic circuit diagram of the charging device in a second operating state.

The charging device 10, especially the DC converter 28, can be operated in a first operating state, shown in FIG. 2, which coincides for example with the motor operation of the electrical machine 16 or is provided in order to realize the motor operation. In the first operating state, electric energy stored in the energy storage device 12 is taken by way of the charging device 10, especially via the DC converter 28, to the electrical machine 16, which is supplied with this electrical energy. FIGS. 2 and 3 show a second embodiment of the charging device 10.

Furthermore, the charging device 10, especially the DC converter 28, can be operated in a second operating state, shown in FIG. 3. The second operating state is provided for the charging or recharging of the energy storage device 12, since in the second operating state the electrical energy provided by the current source is supplied by way of the charging device 10, especially via the DC converter 28, to the energy storage device 12 and stored therein. The second operating state is also called the charging mode. One function of the control unit 34 may be a switching between the two operating states.

In order to charge the electrical energy storage device 12 of the vehicle especially efficiently or advantageously, an especially large inductance of the DC converter 28 is advantageous. Therefore, it is especially advantageous for the charging of the electrical energy storage device 12 to switch the coils 36 electrically in series, wherein the coils 36 form the inductance of the DC converter 28. Thanks to the series connection, respective single inductances of the respective coils 36 add up to form a total inductance. In this way, the installing of another inductance in the DC converter 28 may be omitted, which saves on costs and weight. Thanks to the weight savings, another cost savings results during the operating period of the vehicle, since less energy is consumed during the driving of the vehicle thanks to the lower weight. Furthermore, the number of parts and thus the costs, the weight, and the space requirement can be kept low, since the coils 36 are used both for the electrical machine 16 to drive the vehicle as well as for the charging device 10, especially for the DC converter 28, to charge the energy storage device 12

It can be seen from FIG. 2 that the DC converter 28 comprises the coils 36 of the winding 38 as well as an inverter 40, which, in the first operating state transforms or converts the energy provided by the energy storage device 12 into an alternating current, in order to supply the electrical machine 16 with energy or with alternating current.

Moreover, the DC converter 28 has the input 26 for the input DC voltage 22. By way of the output 32 of the DC converter 28, the energy storage device 12 can be supplied with the charging current. A smoothing capacitor 42 is optional and can smooth out the charging current. Furthermore, a ground connection 44 is provided.

The electrical machine 16 is operated, for example, by means of a rotary current. Since the energy storage device 12, which is designed in particular as a battery, provides a DC voltage, the DC voltage must be converted or transformed into an alternating voltage for the operation of the electrical machine 16 as an electric motor by means of the inverter 40, which is designed, for example, as a pulse inverter and, in this case, for example, as a bridge. A converting into alternating voltage can take place by means of switching elements 46 of the inverter 40. For this purpose, the switching elements 46 are switched for example by the control unit 34. Thus, the inverter 40 works in the first operating state as an inverter. In the first operating state and thus in the motor mode, the coils 36 of the electrical machine 16 are switched in parallel. In this case, the winding 38 comprising the coils 36 has a star point 52, which is located behind the coils 36 when they are being supplied with current or energy from the energy storage device 12.

The control unit 34 is designed for the purpose of switching the coils 36, especially in the motor mode or in the first operating state, so that the coils 36 are interconnected in a star connection and/or a delta connection, in order to supply the electrical machine 16 with electrical energy from the energy storage device 12.

The control unit 34 may take over a controlling or switching or interconnecting of the coils 36 as well as the switching elements 46. Furthermore, the charging device 10 may have an interconnecting unit 48, which takes over the interconnecting of the coils 36 and/or the switching elements 46, wherein the interconnecting unit 48 can be controlled or actuated by the control unit 34.

The second operating state, the charging mode, which is represented in FIG. 3, can be realized by means of the control unit 34 and/or the interconnecting unit 48. In order to realize the second operating state, the control unit 34 or the interconnecting unit 48 switches the coils 36 of the winding 38 of the electrical machine 16 in series in order to obtain the largest possible total inductance, which is composed of the individual inductances of the individual coils 36. Moreover, the inverter 40 no longer functions as an inverter, but instead is switched by the control unit 34 so that it conducts the charging current to the electrical energy storage device 12 without converting it, for example. The inverter 40 and the electrical machine 16 or the coils 36 thereof form respective components of the DC converter 28, which can now be operated or work in the charging mode. In this case, the DC converter 28 now converts the input DC voltage 22 present at its input 26 into the output DC voltage 30, which can be picked off from its output 32.

In this case, the input DC voltage 22 is provided from a current source or power grid not belonging to the vehicle. Depending on the kind of current source, a rectifier may be used, such as the rectifier 14 shown in FIG. 1, for example, in order to generate the input DC voltage 22, for example, from a voltage of the current source. The rectifier may be part of the charging device 10 of the vehicle or part of the charging post of an electric charging station, for example, while the control unit 34 may be adapted so that it controls or actuates the rectifier in both instances.

The electrical energy storage device 12 is electrically connected to the output 32 of the DC converter and draws the charging current through it. Thanks to the total inductance of the series-connected coils 36, an especially advantageous operation of the DC converter 28 is possible. The operation of the DC converter 28 is especially efficient thanks to the use of the inverter 40, which controls the current flow to the energy storage device 12 by means of the control unit 34. Thanks to the use of the inverter 40, which is a component of the vehicle provided in any case for the motor operation, as a component of the DC converter 28, it is possible to do without an extra component which would have to take over the function of the inverter 40 in the charging mode. Thus, this component can be economized, which also saves on costs and weight.

On the whole, both the inverter 40 and the coils 36 play a dual role. In the first operating state, the inverter 40 functions as an inverter, in order to convert or transform the DC voltage provided by the energy storage device 12 into alternating voltage for the electrical machine 16. Moreover, the coils 36 in the first operating state or in the motor operation function as coils of the electrical machine 16, in order to operate it. In the second operating state, that is, in the charging mode, the coils 36 and the inverter 40 form the DC converter 28 for the converting of the input DC voltage 22 into the output DC voltage 30. The coils 36 are switched in series in order to realize an especially advantageous inductance of the DC converter 28. In this way, one may avoid the use of an extra inductance provided only for the DC converter 28.

Figure 4:
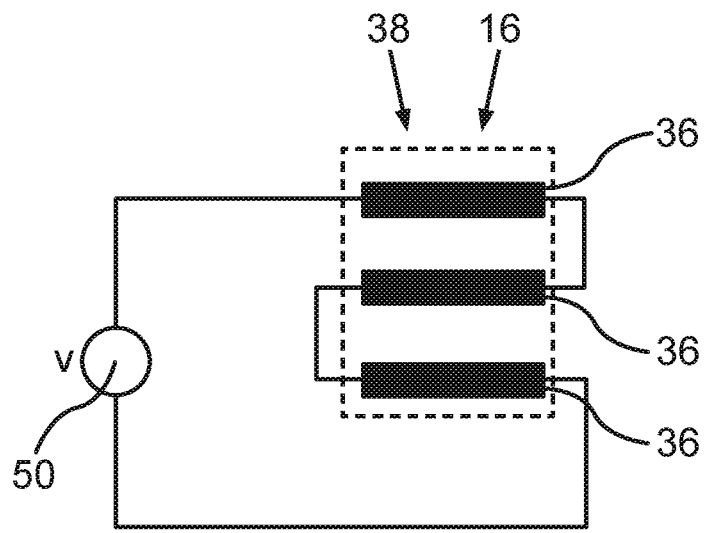
FIG. 4 a schematic circuit diagram of a simulation calculation for the determination of torques on an electrical machine.

FIG. 4 shows a schematic circuit diagram of a simulation calculation to determine the torques of the electrical machine 16. The electrical machine 16, especially in the motor operation, may drive, for example indirectly, at least one wheel of the vehicle. In the charging mode, the electrical machine 16 or a portion of the electrical machine 16, especially its coils 36, will be used as a component of the DC converter 28 of the charging device 10. In this way, a voltage, especially a DC voltage, will be applied to the winding 38, which is formed from the coils 36. Thanks to the voltage applied, a torque can be generated in the electrical machine. By means of the simulation calculation, one verifies whether the torque in the charging mode is so small that the electrical machine 16 suffers no damage and/or, for example, the at least one wheel of the vehicle is driven so slightly that the vehicle cannot move.

In a first simulation, a DC voltage of 100 V was applied at a voltage source 50 of the circuit, shown by the circuit diagram of FIG. 4. In this case, a torque of 0.5 Nm was established and operates in the electrical machine 16. This torque is negligible, since it is not enough to move the vehicle forward.

In a second simulation, an alternating voltage with a peak value of 48 V was applied at the voltage source 50. The electrical machine 16 was able to draw a current of 75 A in the simulation in this case, establishing a torque of 0.2 Nm. The results of the two simulations show that an interconnecting of the coils 36 of the electrical machine 16 in series as a component of the DC converter 28 for the charging mode presents no danger to the vehicle or its surroundings.

The invention claimed is:

1. A charging device for a vehicle, comprising:
a DC converter for converting an input DC voltage into an output DC voltage for the charging of an electrical energy storage device of the vehicle, wherein one winding of an electrical machine is part of the DC converter, wherein the winding has at least two coils, and with a control unit for actuating the DC converter, wherein the control unit is designed for the purpose of switching the at least two coils electrically in series for the charging of the electrical energy storage device, wherein the at least two coils form an inductance of the DC converter, wherein the DC converter has an inverter, wherein a first lead of the inverter is connected to the at least two electrically series-connected coils, and a second lead of the inverter is connected to the electrical energy storage device, wherein the charging device has a rectifier, which is connected at its output to the DC converter, wherein the control unit actuates the rectifier for the charging of the electrical energy storage device.

2. The charging device according to claim 1, wherein the inverter has at least one switching element and the control unit is designed for the purpose of actuating the at least one switching element to charge the electrical energy storage device.

3. The charging device according to claim 1, wherein the DC converter has an interconnecting unit for switching the at least two coils in series, and the control unit is designed for the purpose of actuating an interconnecting unit to charge the electrical energy storage device.

4. The charging device according to claim 1, wherein the control unit is designed for the purpose of switching the at least two coils in parallel with each other or to establish a star connection includes the at least two coils or a delta connection including the at least two coils in order to supply the electrical machine with electrical energy from the energy storage device.

5. A method for charging an electrical energy storage device of a vehicle, comprising:
an input DC voltage is converted into an output DC voltage by a DC converter for charging the electrical energy storage device, wherein a winding having at least two coils of an electrical machine of the vehicle is used as part of the DC converter, and wherein the DC converter is actuated by a control unit, wherein the at least two coils are switched electrically in series by the control unit by way of the actuating of the DC converter for the charging of the electrical energy storage device, wherein the at least two coils form an inductance of the DC converter, wherein the DC converter has an inverter, wherein a first lead of the inverter is connected to the at least two electrically series-connected coils, and a second lead of the inverter is connected to the electrical energy storage device, wherein the charging device has a rectifier, which is connected at its output to the DC converter, wherein the control unit actuates the rectifier for the charging of the electrical energy storage device.

* * * * *